Dec. 21, 1954  J. KALLENBORN ET AL  2,697,312
APPARATUS FOR FABRICATING CELLULATED MATERIAL
Filed April 18, 1952
2 Sheets-Sheet 1

INVENTORS
JOHN KALLENBORN
MONTGOMERY J. SHOEMAKER
HOWARD E. JOHNSON
BY Oscar L. Spencer
ATTORNEY Dec. 21, 1954
J. KALLENBORN ET AL
2,697,312
APPARATUS FOR FABRICATING CELLULATED MATERIAL
Filed April 18, 1952
2 Sheets-Sheet 2
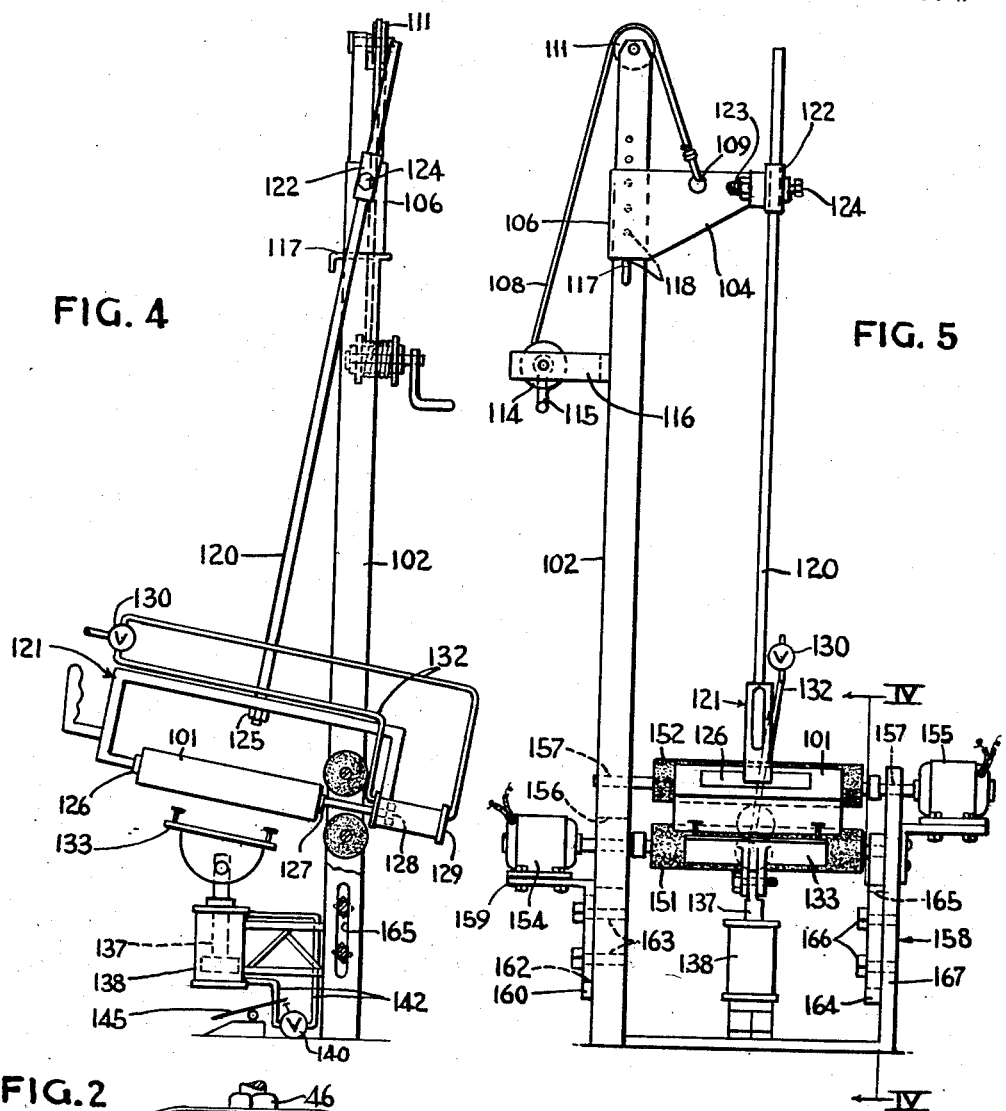
INVENTORS
JOHN KALLENBORN
MONTGOMERY J. SHOEMAKER
BY HOWARD E. JOHNSON
Oscar L. Spencer
ATTORNEY United States Patent Office 2,697,312
Patented Dec. 21, 1954

2,697,312

APPARATUS FOR FABRICATING CELLULATED MATERIAL

John Kallenborn, Port Allegany, Pa., Montgomery J. Shoemaker, Olean, N. Y., and Howard E. Johnson, Port Allegany, Pa., assignors to Pittsburgh Corning Corporation, Pittsburgh, Pa., a corporation Application April 18, 1952, Serial No. 282,948

4 Claims. (Cl. 51—86)

The present invention relates to a process of and an apparatus for externally forming curved shapes from blanks and it has particular relation to a process of and an apparatus for forming curved shapes from rectangular slabs of a cellulated vitreous substance such as cellulated glass.

One object of the invention is to provide a method and apparatus for forming curved shapes of cellulated glass suitable for use as insulation for large cylindrical storage tanks from rectangular slabs of cellulated glass.

Another object of the invention is to provide a method and an apparatus for forming curved shapes of cellulated glass suitable for use as insulation on large spherical storage tanks from rectangular slabs of cellulated glass.

These and other objects of the invention will be apparent from consideration of the following specification and the appended claims.

It has heretofore been proposed to form thermally insulative material from glass by finely pulverizing glass, and mixing it with carbonaceous materials such as powdered coal or charcoal and heating the mixture in molds of appropriate shape in order to sinter and cohere the particles of glass and to effect chemical reaction of the carbonaceous material with oxygen supplying constituents of the glass to generate bubbles of entrapped gas in the coherent mass.

In accordance with such method, the cellulated bodies such as blocks or slabs are formed in molds of appropriate design. This method cannot well be adapted to form shapes and bodies where a certain degree of accuracy or precision of outline is required. For example, it is not well adapted for the molding or forming of curved shapes of cellular glass such as might be employed as segments for an insulative covering for large spherical or cylindrical storage tanks. This is true because molds of many different shapes would be required and it would be impracticable to strip the molds from the finished product. Also the product in the course of cooling and annealing tends strongly to distort. Thus, no convenient method of providing curved shapes by a simple molding operation is available.

The present invention contemplates a process of and suitable apparatus for shaping curved shapes of a cellulated material adaptable for use as insulation for large cylindrical or spherical storage tanks from rectangular slabs of a cellulated vitreous material such as cellulated glass. In accordance with the present invention a method of forming curved shapes from rectangular slabs of a cellulated vitreous material is provided in which a slab of the cellulated vitreous material is passed between a pair of rotating abrading elements in a path of predetermined curvature so as to shape the two larger surfaces of the slab to a predetermined curvature. Thereafter, the slab may be brought into contact with a suitable beveling means so that the sides or edges of the shaped slabs are beveled at a predetermined angle. It is also contemplated that the sides of the rectangular slabs of cellulated material may be beveled before the larger surfaces are shaped to a predetermined curvature.

According to another embodiment of the invention, an apparatus for shaping the slabs of cellulated material to the desired curvature is provided which comprises relatively movable mechanisms, one of the mechanisms including a means for supporting a slab of the cellulated material, the other of the mechanisms including slab shaping abrading elements, one of said mechanisms having means for guiding it movably along a path of predetermined curvature in such manner as to cause the slab of cellulated material to pass between the abrading elements to shape the slab to a predetermined curvature.

One embodiment of the invention which is concerned with an apparatus suitable for shaping and abrading the slabs of cellulated material involves an apparatus in which the means for supporting the cellulated material constitutes a swinging arm having a suitable holding or clamping means at one end of the arm. This swinging arm is mounted in such a manner that the cellulated material can swing in a curved path between the abrading elements. The swinging may be in one plane or a multitude of planes depending upon the method of mounting of the supporting means.

For example, if the clamping or supporting means for the slab is axially mounted, the supporting means swings in one plane and a cylindrical segment is produced. However, if the supporting means is connected to a universal or ball joint, it is free to swing in a multitude of planes and thus shape a spherical segment.

The radius of curvature of the path in which the slab of cellulated material passes in such apparatus is determined by the length of the swinging arm. Thus, the radius of curvature may be changed by adjusting the mounting of the swinging arm.

The abrading elements are mounted in relation to the path of curvature so that one of the abrading elements is on one side of the path of curvature and the other abrading element is on the other side. The distance between the abrading elements determines the final thickness of the shaped slab. The abrading elements are in the form of rollers and may be surfaced with coarse sand paper or other abrasive material.

For a better understanding of the invention, reference may now be had to the accompanying drawings in which like numerals refer to like parts throughout and in which:

Fig. 2 is a fragmentary front elevation illustrating a portion of the cellulated slab supporting means of the apparatus shown in Fig. 1;

Fig. 4 is a diagrammatic view partially in section taken along lines IV—IV of Fig. 5 and partially in elevation of an apparatus suitable for shaping cylindrical tank wall segments from a rectangular slab of cellulated material and Fig. 5 is a diagrammatic front elevation of the apparatus shown in Fig. 4.

Figures 1, 3:
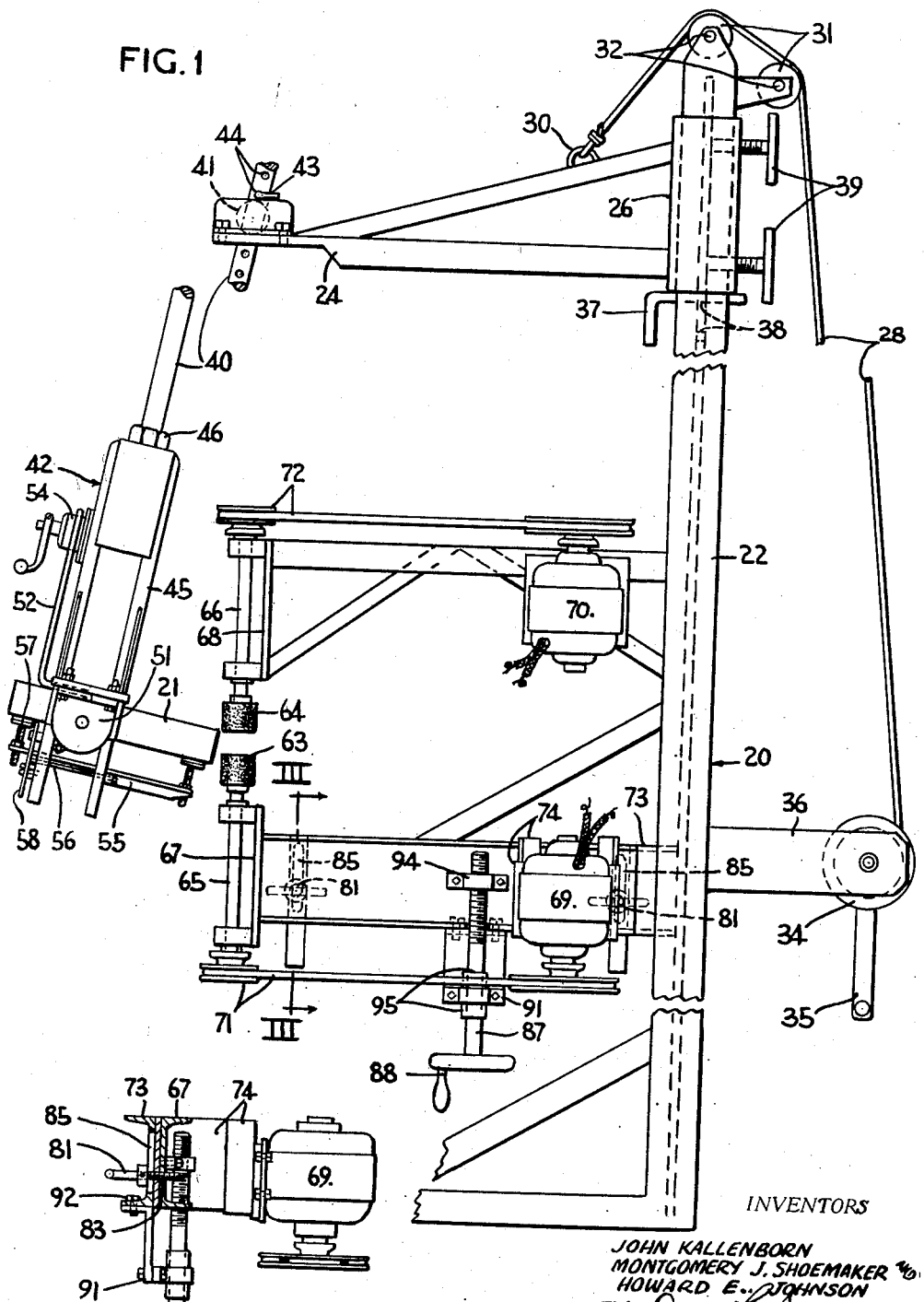
Fig. 1 is a fragmentary side elevation of an apparatus suitable for shaping spherical tank wall segments from a rectangular slab of a cellulated material.
Fig. 3 is a front view, partially in section and partially in elevation taken along lines III—III of Fig. 1 and shows a means for adjustably mounting one of the rotating abrading elements of the apparatus illustrated in Fig. 1.

In Fig. 1 of the drawings, an apparatus 20 suitable for shaping spherical tank wall segments from a rectangular slab 21 of cellulated material such as cellulated glass, is shown. The apparatus includes a vertical support member 22 made of angle iron or other suitable material. A horizontal support member 24 is adjustably attached near the top of the vertical support member 22. One end of horizontal support member 24 is in the form of a sleeve 26 which is vertically slidable upon support 22. The support 24 may be moved up and down support 22 by means of a pulley system in which a rope or wire 28 is connected at one end to the support 24 at fastener ring 30 and runs over pulleys 31, which are rotatably mounted as indicated at 32 near the top of support 22, to a drum 34 and crank 35 rotatably mounted on an arm 36 which is rigidly connected to support 22 near the bottom of the support.

When the horizontal support 24 has been located at the desired height or position on vertical support 22, it may be supported in position by means of a pin 37 which is fitted into one of a number of openings 38 in the support 22. Sleeve 26 is then rigidly connected to the support 22 by tightening of screws 39. A free-swinging arm 40 is adjustably attached at the outer end portion of horizontal support 24 by means of a ball joint 41. At the end of arm 40 is attached a clamping means and holder 42 for a slab 21 of cellulated material. The distance from the ball joint 41 to the clamping means 42 may be varied by sliding arm 40 through the ball joint to achieve the predetermined distance and then securing the arm at this distance by means of suitable pin 43 insertable in one of several openings 44 in arm 40. Thus it can be seen that the radius of curvature of the path traveled by the clamping means can be varied by varying respectively the connection of arm 40 on support 24 and the connection of sleeve 26 on support 22.

The clamping means 42 comprises an inverted U-shaped frame 45 attached centrally at 46 to the end of arm 40. Clamps 47 and 48 for engaging the slab 21 of cellular material are attached to the ends of the frame 45. Clamp 47 is connected to the inner end of a screw 49 which is threaded through one lower end of frame 45 and which may be adjusted in accordance with the size of slab to be shaped. Clamp 48 is attached to a piston 50 and cylinder 51 which is mounted on the opposing lower end of frame 45. The piston 50 is actuated by means of a suitable fluid such as air which flows to the cylinder through lines 52. The fluid is supplied to lines 52 from supply 53 by valve 54.

A frame rack 55 for supporting the slab 21 in proper position for engagement thereof by clamps 47 and 48 is pivotally mounted as indicated at 56 upon one leg of the U-shaped frame 45. Suitable rods 57 screw threaded through the rack are designed to be adjusted so as to support the slab at the exact position required for clamping. A latch 58 having a pivotal connection 59 upon the rack holds the latter in slab aligning position with the aid of a detent 60 over which the latch snaps to hold the rack 55 in its elevated position. A stop 61 on the rack and a spring 62 connected to the rack and latch cooperate to hold the latch normally in such position as to snap into engagement with the detent in response to upward swinging of the rack toward the position in which it supports the slab to be clamped.

The slab is then clamped into position by actuation of the valve 54 to cause clamp 48 to move forward and engage the edges of the slab in cooperation with clamp 47. After the slab has been secured between clamps 47 and 48, the latch 58 is released and the rack 55 is swung down and out of the way so that arm 40 containing the slab of cellulated material may be swung in an arcuate path between abrading elements 63 and 64.

The abrading elements 63 and 64 are in the form of small cylindrical abrasive elements which are axially aligned and rigidly carried on the adjacent inner ends of shafts 65 and 66. The shafts 65 and 66 are rotatably mounted respectively in frames 67 and 68. The abrading elements are rotated by means of power supplied from motors 69 and 70 and transmitted to the abrading elements through transmission elements 71 and 72. The abrading elements are designed for localized abrading and shaping and may be spherical in form in order to theoretically achieve pin point shaping.

Abrading element 63, motor 69 and transmission elements 71 can be moved vertically on a rigid arm 73 in order that the distance between the abrading elements may be changed to shape slabs of varying thicknesses. The distance between the abrading elements will determine the thickness of the shaped slab of cellulated material.

The manner in which the distance between the abrading elements 63 and 64 may be adjusted is illustrated in Fig. 3 and Fig. 1. The motor 69 is rigidly fixed to frame 67 by means of plates 74. Frame 67 is adjustably attached to rigid arm 73 by means of bolts 81 which are threaded into frame 67 at 83. The bolts 81, when not tightened, are free to move vertically through slots 85 in rigid arm 73.

The movement of frame 67 with relation to rigid arm 73 is accomplished by the turning of a vertical rod 87 which is turned by handle 88. The vertical rod 87 rotates in the bearing bracket 91 which is rigidly attached to rigid arm 73 at 92. The upper end of vertical rod 87 is screw threaded into a block 94 which is rigidly mounted on the frame 67. The vertical rod 87 is held against vertical movement relative to the bracket 91 by means of collars 95. By means of such adjustment or other suitable adjusting means the distance between the abrading elements 63 and 64 can be varied.

In Figs. 4 and 5 of the drawings, an apparatus suitable for shaping cylindrical tank wall segments of a cellulated material such as cellulated glass 101 is shown. The apparatus includes a vertical support member 102 made of angle iron or other suitable material. A horizontal support member 104 is adjustably attached to the vertical support member near the top of said vertical support. One end of horizontal support member 104 is in the form of a sleeve 106 which may slide up and down support 102. The support 104 may be moved up and down support 102 by means of a pulley system in which a cable 108 is connected at one end to the support 104 at 109 and runs over pulley 111, which is rotatably connected at the top of support 102, to a drum 114 and crank 115 which are rotatably mounted on a bracket 116 which is rigidly connected to vertical support 102.

When the horizontal support 104 has been located at the desired position on vertical support 102, it may be supported in position by means of a pin 117 which is fitted into one of a number of openings 118 in the support 102.

A swinging arm 120 is pivotally attached at the outer end portion of horizontal support 104. At the lower end of this arm 120 is attached a clamping means and holder 121 for a slab of cellulated material. The length of the arm 120 i. e. the distance between the pivotal connection and the clamping means may be varied by sliding arm 120 through a sleeve 122 pivotally connected to support 104 by means of a pin integral with the sleeve. When the desired distance has been attained, the arm may be securely fastened to the sleeve by tightening of a set screw 124.

The clamping means 121 comprises an inverted U-shaped frame attached centrally at 125 to the end of arm 120. Clamps 126 and 127 for engaging slab 101 are attached to the lower ends of the frames. Clamp 127 is attached to piston 128 and cylinder 129 which comprise part of the clamping mechanism, the actuation of which is controlled by means of a valve 130 which controls the flow of a suitable fluid such as air, through lines 132 to the cylinder.

The slab 101 is inserted between the clamps 126 and 127 by means of a tiltable table 133 or a rack which is supported on a piston 137 and cylinder 138 which cause the table to move vertically by actuation of the piston. The actuation of the piston is effected by means of valve 140 which controls the flow of a suitable fluid such as air, through lines 142 to the cylinder 138. The valve 140 may be actuated by means of a pedal 145 connected to the valve.

When the slab 101 has been moved upwardly between the clamps 126 and 127 by piston 137, it is secured between clamps 126 and 127 by actuation of the piston 128 to cause clamp 127 to move forward and engage the edges of the slab in cooperation with clamp 126. After the slab 101 has been secured between the clamps 126 and 127, the arm 120 containing the slab of material is swung in a predetermined arcuate path between abrading elements 151 and 152.

The abrading elements 151 and 152 comprise long cylindrical abrasive elements which are in vertical alignment one above the other and which are rotated by means of power axially supplied from motors 154 and 155. The distance between the cylindrical abrading elements 151 and 152 is adjusted to the final thickness desired in the slab 101 to be shaped.

The lower and upper abrasive elements 151 and 152 are mounted in slot 156 and bearing 157 respectively which are formed in the support 102, and in a cooperating frame structure 158. A platform 159 supports the lower motor 154 and is provided with an extension 160 which is formed with a vertical slot 162. Adjusting bolts 163 extend through the slot 162 and are threaded into the support 102. By unscrewing the bolts 163 the motor with the lower abrading element 151 can be adjusted vertically.

The frame structure 158 includes a bearing plate 164 in which the outer bearing end of the abrading element 151 is supported. This plate is formed with a vertical slot 165 which received bolts 166 which are threaded into a stationary part 167 of the frame structure 158. Adjustment of the bolts 163 and 166 can be coordinated to position the abrading element 151 at the proper position and spacing with respect to the abrading element 152.

The slab 101 is passed through the abrading elements once and returned and is thereby provided with a curved surface on the larger upper and lower surfaces of the slab. The slab is then removed from the clamps 126 and 127 by actuation of value 130 to cause piston 128 to move backward to disengage the slab. The slab 101, having its two larger surfaces thus shaped is then ready to have its edges beveled by a suitable beveling apparatus.

In order to carry away the dust abraded from the slabs of cellulated material in the shaping operations described above, suitable ventilating apparatus (not shown) is provided in the general vicinity of the abrading elements. The apparatus may include a funnel shaped head connected to a ventilating duct. The duct is provided with a suitable fan mechanism for generating a suction in the duct in order to carry away the dust from the shaping operation.

From the above description of the invention it can be seen that a novel method and apparatus for producing curved segments of cellulated glass suitable for use as insulation for cylindrical and spherical storage tanks has been provided. Such method and apparatus enables the production of such curved segments with a high degree of accuracy not heretofore obtainable.

It will be appreciated by those skilled in the art that the embodiments of the invention herein shown and described are merely by way of example. It will be apparent that numerous modifications may be made therein without departure from the scope of the appended claims.

We claim:

1. An apparatus for shaping a slab of cellulated material which comprises a holder positively engageable with the slab to support the latter, a support having a universal joint carrying the holder for arcuate movement in various directions about the universal joint, rotatably driven abrading elements designed for localized abrading disposed on opposite sides of the area of arcuate movement of the holder and abrasively engageable with opposite surfaces of the slab to shape the surfaces thereof to arcuate form and means rotatably supporting the abrading elements.

2. An apparatus for shaping a slab of cellulated material which comprises a holder positively engageable with the slab to support it, a support having a universal joint carrying the holder for arcuate movement in various directions about the universal joint, a rotatable driven abrading element designed for localized abrading disposed adjacent the area of arcuate movement of the holder and abrasively engageable with a surface of the slab to shape the surface thereof to arcuate form, and means rotatably supporting the abrading element.

3. An apparatus for shaping a slab of cellulated material which comprises a holder positively engageable with the slab to support it, a support having a universal joint carrying the holder for arcuate movement in various directions about the universal joint, a rotatable driven abrading element disposed adjacent the area of arcuate movement of the holder and abrasively engageable with a surface of the slab to shape the surface thereof to arcuate form, and means rotatably supporting the abrading element.

4. An apparatus for shaping a slab of cellulated material which comprises a holder positively engageable with the slab to support it, a support having a universal joint carrying the holder for arcuate movement in various directions about the universal joint, rotatable driven abrading elements disposed on opposite sides of the area of arcuate movement of the holder and abrasively engageable with opposite surfaces of the slab to shape the surfaces thereof to arcuate form, and means rotatably supporting the abrading elements.

References Cited in the file of this patent

UNITED STATES PATENTS

| Number | Name | Date |
|---|---|---|
| 507,639 | Smith | Oct. 31, 1893 |
| 635,777 | Howe | Oct. 31, 1899 |
| 666,461 | Boyle | Jan. 22, 1901 |
| 732,657 | Schuessler | June 30, 1903 |
| 944,300 | Van Dervort | Dec. 28, 1909 |
| 1,331,037 | Sullivan | Feb. 17, 1920 |
| 1,509,585 | Chase | Sept. 23, 1924 |
| 1,717,899 | Sundstrand | June 18, 1929 |
| 2,212,179 | Martin | Aug. 20, 1940 |
| 2,595,115 | Wiley | Apr. 29, 1952 |